United States Patent
Shi et al.

(10) Patent No.: US 12,307,285 B2
(45) Date of Patent: May 20, 2025

(54) MINI APP SWITCHING METHOD, FRAMEWORK, ELECTRONIC APPARATUS AND NON-TRANSITORY COMPUTER-READABLE STORAGE MEDIUM

(71) Applicant: Baidu Online Network Technology (Beijing) Co., Ltd., Beijing (CN)

(72) Inventors: Nansheng Shi, Beijing (CN); Malin Xie, Beijing (CN); Jiao Cao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 344 days.

(21) Appl. No.: 17/279,211

(22) PCT Filed: Jul. 13, 2020

(86) PCT No.: PCT/CN2020/101694
§ 371 (c)(1),
(2) Date: Mar. 24, 2021

(87) PCT Pub. No.: WO2021/098239
PCT Pub. Date: May 27, 2021

(65) Prior Publication Data
US 2022/0114012 A1    Apr. 14, 2022

(30) Foreign Application Priority Data
Mar. 26, 2020    (CN) .......................... 202010225898.8

(51) Int. Cl.
*G06F 9/48*    (2006.01)
*G06F 3/048*    (2013.01)
(Continued)

(52) U.S. Cl.
CPC ............... *G06F 9/48* (2013.01); *G06F 3/048* (2013.01); *G06F 3/0481* (2013.01);
(Continued)

(58) Field of Classification Search
CPC . G06F 9/46; G06F 9/48; G06F 9/4806; G06F 9/4843; G06F 9/50; G06F 9/5005;
(Continued)

(56) References Cited

U.S. PATENT DOCUMENTS 7,123,945 B2 * 10/2006 Kokubo ............ H04M 1/72403
345/169
9,122,518 B2 *  9/2015 Choi ........................ G06F 9/451
(Continued)

FOREIGN PATENT DOCUMENTS

CN    106843664 A    6/2017
CN    107357644 A   11/2017
(Continued)

OTHER PUBLICATIONS

Japan Patent Office, JP First Office Action issued on Jun. 7, 2022 for application No. JP2021-517748.
(Continued)

*Primary Examiner* — Charles M Swift
(74) *Attorney, Agent, or Firm* — HOUTTEMAN LAW LLC

(57) ABSTRACT

Embodiments of the present disclosure relate to the field of computer technology, and provide a mini application (app) switching method and device, a framework, an apparatus and a readable medium. The method includes: receiving a first input for a current mini app, the current mini app being a mini app currently displayed in a preset application; displaying at least one piece of mini app display information, in response to the first input; receiving a second input for target mini app display information among the at least
(Continued)

one piece of mini app display information; and switching a currently displayed mini app to a target mini app corresponding to the target mini app display information in the preset application, in response to the second input.

18 Claims, 4 Drawing Sheets

(51) Int. Cl.
    *G06F 3/0481*     (2022.01)
    *G06F 3/04815*     (2022.01)
    *G06F 3/04817*     (2022.01)
    *G06F 3/0482*     (2013.01)
    *G06F 9/44*     (2018.01)
    *G06F 9/445*     (2018.01)
    *G06F 9/448*     (2018.01)
    *G06F 9/451*     (2018.01)
    *G06F 3/04883*     (2022.01)

(52) U.S. Cl.
    CPC ...... *G06F 3/04815* (2013.01); *G06F 3/04817* (2013.01); *G06F 3/0482* (2013.01); *G06F 9/44521* (2013.01); *G06F 9/4482* (2018.02); *G06F 9/451* (2018.02); *G06F 3/04883* (2013.01)

(58) Field of Classification Search
    CPC .... G06F 3/048; G06F 3/0481; G06F 3/04815; G06F 3/04817; G06F 3/0482; G06F 3/04883
    See application file for complete search history.

(56) References Cited

U.S. PATENT DOCUMENTS

| | | | |
|---|---|---|---|
| 9,262,035 | B1 | 2/2016 | Gustafson et al. |
| 10,063,645 | B2 * | 8/2018 | Yavilevich ............ H04L 67/535 |
| 2007/0130563 | A1 * | 6/2007 | Elgazzar ................ G06F 40/58 717/137 |
| 2011/0090402 | A1 * | 4/2011 | Huntington ........ H04N 21/4314 348/E5.103 |
| 2015/0346961 | A1 * | 12/2015 | Cui ..................... G06F 3/04817 715/838 |
| 2016/0103668 | A1 * | 4/2016 | Srinivasan ................ G06F 8/61 717/178 |
| 2017/0097743 | A1 * | 4/2017 | Hameed ................ G06F 3/0484 |
| 2017/0322720 | A1 | 11/2017 | Thakur et al. |
| 2019/0278431 | A1 * | 9/2019 | Dunning .......... G06Q 10/06315 |

FOREIGN PATENT DOCUMENTS

| | | |
|---|---|---|
| CN | 108196930 A | 6/2018 |
| CN | 108932147 A | 12/2018 |
| CN | 110083413 A | 8/2019 |
| CN | 111324397 A | 6/2020 |
| JP | 2001005585 A | 1/2001 |
| JP | 2007280075 A | 10/2007 |
| JP | 2013501415 A | 1/2013 |
| JP | 2014059736 A | 4/2014 |
| JP | 2018195208 A | 12/2018 |
| WO | 2014006946 A1 | 1/2014 |
| WO | 2017095955 A1 | 6/2017 |

OTHER PUBLICATIONS

WIPO, International Search Report issued on Dec. 15, 2020.
China Patent Office, First Office Action issued on Apr. 16, 2021 regarding CN202010225898.8.
European Patent Office, Extended European Search Report issued on Oct. 19, 2021 for application No. EP20864283.5.

* cited by examiner

MINI APP SWITCHING METHOD, FRAMEWORK, ELECTRONIC APPARATUS AND NON-TRANSITORY COMPUTER-READABLE STORAGE MEDIUM

CROSS-REFERENCE TO RELATED APPLICATIONS

This application is a National Stage of International Application No. PCT/CN2020/101694, filed Jul. 13, 2020, which claims priority to Chinese Patent Application No. 202010225898.8, filed Mar. 26, 2020, both of which are hereby incorporated by reference in their entireties.

TECHNICAL FIELD

Embodiments of the present disclosure relate to the field of computer technology, and particularly to a mini application (app) switching method and device, a framework, an apparatus and a readable medium.

BACKGROUND

With the explosive growth of mini apps, various applications and products based on mini apps are gradually being paid attention and used. A mini app is an application that does not need to be downloaded and installed specially, but runs on a client side of a third-party app, such as a super app. Its acquisition and dissemination are very convenient, which can provide mobile terminal users with better user experience.

In a process of using the mini app, if a mini app A is used currently and it is needed to switch to a mini app B, a user needs to exit the currently opened mini app A, then find the mini app B in the application on which the mini app A is running, and then open the mini app B for use. The mini app switching method is single, and the switching process is cumbersome and inefficient.

SUMMARY

According to embodiments of the present disclosure, provided are a mini app switching method and device, a framework, an apparatus and a readable medium, so as to solve the problems of a single switching method between mini apps, a cumbersome process and low efficiency.

In a first aspect, according to embodiments of the present disclosure, provided is a mini app switching method, including: receiving a first input for a current mini app, the current mini app being a mini app currently displayed in a preset application; displaying at least one piece of mini app display information, in response to the first input; receiving a second input for target mini app display information among the at least one piece of mini app display information; and switching a currently displayed mini app to a target mini app corresponding to the target mini app display information in the preset application, in response to the second input.

In a second aspect, according to embodiments of the present disclosure, provided is a mini app switching device, including: a first input receiving module configured to receive a first input for a current mini app, the current mini app being a mini app currently displayed in a preset application; a first display module configured to display at least one piece of mini app display information, in response to the first input; a second input receiving module configured to receive a second input for target mini app display information among the at least one piece of mini app display information; and a second display module configured to switch a currently displayed mini app to a target mini app corresponding to the target mini app display information in the preset application, in response to the second input.

In a third aspect, according to embodiments of the present disclosure, provided is a mini app framework, configured to code-pack a stored computer program and provide a unified Application Program Interface for the code-packed computer program. The computer program is used to implement any one of the above-mentioned mini app switching methods.

In a fourth aspect, according to embodiments of the present disclosure, provided is an electronic apparatus, including: at least one processor; a memory storing at least one program thereon, where when the at least one program is executed by the at least one processor, the at least one processor implements any one of the above-mentioned mini app switching methods; and at least one I/O interface, connected between the at least one processor and the memory, and configured to implement information interaction between the processor and the memory.

In a fifth aspect, according to embodiments of the present disclosure, provided is a computer-readable medium storing a computer program thereon. The computer program is executed by a processor to implement any one of the above-mentioned mini app switching methods.

According to the mini app switching method and device, framework, apparatus and readable medium provided by the embodiments of the present disclosure, when a first input is received in a current mini app that is running in a preset application, at least one piece of mini app display information is displayed for a user to select target mini app display information, in response to the first input, and a target mini app corresponding to the selected target mini app display information is displayed. The mini app switching method simplifies switching steps between mini apps, and improves the efficiency of switching between mini apps, thereby reducing the switching time cost, and solving the problems of a single switching method between mini apps, a cumbersome process and low efficiency.

BRIEF DESCRIPTION OF THE DRAWINGS

The accompanying drawings are used to provide a further understanding of embodiments of the present disclosure, and constitute a part of the specification. The accompanying drawings, together with the embodiments of the present disclosure, are used to explain the present disclosure, rather than limiting the present disclosure. The above and other features and advantages will become more apparent to those having ordinary skill in the art from the detailed description of exemplary embodiments with reference to the accompanying drawings. The drawings are as follows.

DETAILED DESCRIPTION

In order to enable those having ordinary skill in the art to better understand the technical solutions of the present disclosure, a mini app switching method and device, a framework, an apparatus and a readable medium according to the present disclosure will be described in detail below in conjunction with the accompanying drawings.

Although exemplary embodiments will be described in more detail below with reference to the accompanying drawings, the exemplary embodiments can be embodied in various forms, and should not be interpreted as limitation to the present disclosure. Rather, these embodiments are provided for facilitating thorough and complete understanding of the present disclosure, and enabling those having ordinary skill in the art to fully understand the scope of the present disclosure. The embodiments and features in the embodiments can be combined with each other without conflict.

Figure 1:
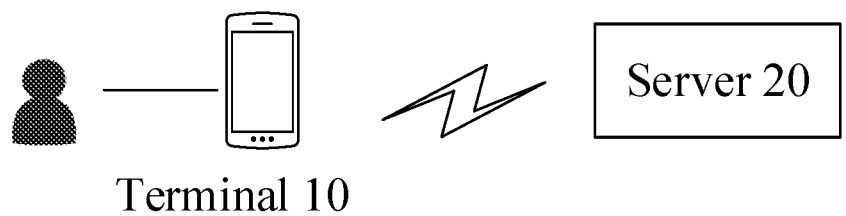
FIG. 1 is a schematic diagram of a scenario according to an embodiment of the present disclosure.

FIG. 1 is a schematic diagram of a scenario according to an embodiment of the present disclosure. In the scenario shown in FIG. 1, a terminal 10 and a server 20 are included. Applications may be run in the terminal 10, and a mini app may be loaded on a certain application. For example, a mini app may be called in a variety of applications such as social applications, map applications, search and resource applications, etc.

The terminal 10 may access the Internet. Illustratively, the terminal 10 may include, but is not limited to, a mobile phone, a personal computer, a tablet computer, a smart wearable device, a desktop computer, a notebook computer, and the like. All of them may be provided with various applications.

The server 20 may be a background server of an application run by the terminal 10, and the server 20 may establish communication with the terminal 10. The server 20 may be one service device or a server cluster composed of multiple service devices. A specific allocation of processing tasks of the server may be flexibly adjusted according to practical application requirements.

All of the following embodiments can be applied to the system architecture in this embodiment. For concise description, the following embodiments may refer to and quote each other.

Figure 2:
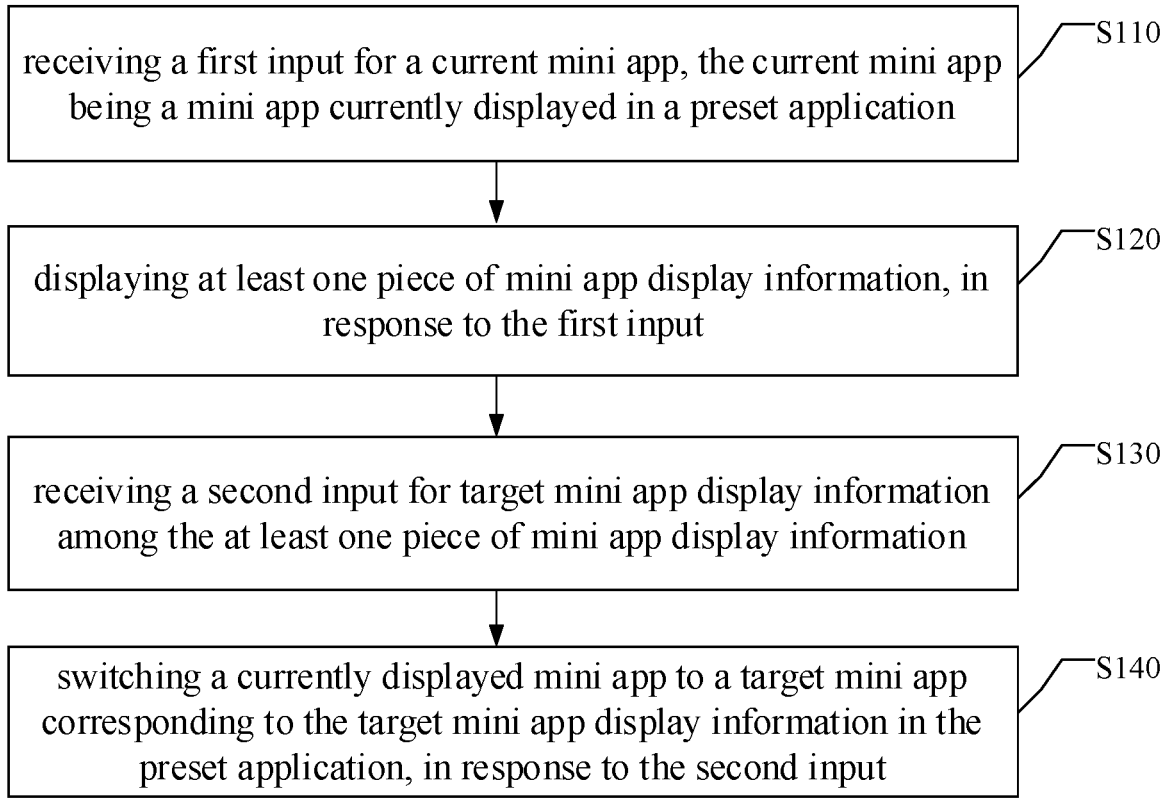
FIG. 2 is a flowchart of a mini app switching method according to an embodiment of the present disclosure.

FIG. 2 is a flowchart of a mini app switching method according to an embodiment of the present disclosure. As shown in FIG. 2, the mini app switching method may include the following steps.

In step S110, a first input for a current mini app is received. The current mini app is a mini app currently displayed in a preset application.

In step S120, at least one piece of mini app display information is displayed, in response to the first input.

In step S130, a second input for target mini app display information among the at least one piece of mini app display information is received.

In step S140, a currently displayed mini app is switched to a target mini app corresponding to the target mini app display information in the preset application, in response to the second input.

According to the mini app switching method provided by the embodiments of the present disclosure, the first input is received in the current mini app which is running in the preset application, the at least one piece of mini app display information is displayed in response to the first input, and thus a user selects the target mini app display information, and the target mini app corresponding to the target mini app display information is displayed.

According to the mini app switching method, when the user switches from a currently running mini app to another mini app, the switching of the mini apps may be performed without exiting the currently running mini app first, thereby simplifying the switching process of mini apps, improving the efficiency of switching mini apps, reducing the time cost of switching, and highlighting the advantages of convenient operation of mini apps.

In one embodiment, the first input is a specific gesture input, and the specific gesture input is different from an other preset gesture input, and the other gesture input is an input for the preset application. Before receiving the first input for the current mini app, the mini app switching method further includes the following step. In step S21, the specific gesture input for the current mini app is monitored through a gesture monitor.

In one embodiment, the second input includes, but is not limited to, a click input. The click input may be an input through which the target mini app display information may be selected, such as a single-click input, a long-press input, etc.

In this embodiment, the gesture monitor may be used to monitor the specific gesture input which is generated based on a direction of a user's finger movement for the current mini app, and the monitored specific gesture input may be used to trigger the display of the at least one piece of mini app display information.

In an example, the monitored specific gesture input includes, but is not limited to, a two-finger upward sliding input, a three-finger upward sliding input, a two-finger downward sliding input, and a two-finger sliding input, etc.

In an example, the mini app display information includes, but is not limited to, information used to identify a mini app for selection, such as an icon or text information of the mini app.

In one embodiment, step S120 may specifically include the following steps. In step S31, a mini app browsing component is displayed in a preset manner on a display interface of the current mini app, in response to the first input. In step S32, the at least one piece of mini app display information is displayed through the mini app browsing component.

In this embodiment, the preset manner includes, but is not limited to, displaying the mini app browsing component in a pop-up or floating layer manner. For example, the mini app browsing component may be displayed in an upper layer of the display interface of the current mini app.

In this embodiment, when the specific gesture input triggered by the user is monitored, a commonly used mini app browsing component is called, and the target mini app can be selected by the user without exiting the current mini app, thereby simplifying the user's operation of selecting the target mini app, and improving the efficiency of switching mini apps. Moreover, since there is no need to exit the current mini app, the user's attention paid to the process of using the mini app will not be distracted, which greatly improves the user experience.

In one embodiment, step S120 may specifically include the following steps. In step S41, a mini app browsing record of the preset application is obtained, in response to the first input. The mini app browsing record comes from a terminal provided with the preset application or a designated server. In step S42, at least one recently browsed mini app is obtained from the mini app browsing record of the preset application, according to a sorting of the number of browsing. In step S43, mini app display information of the at least one recently browsed mini app is displayed.

In this embodiment, the mini app browsing component can be used to display browsing information of recently browsed mini apps or browsing information of recently opened mini apps, which is convenient for the user to quickly select the target mini app and improves the efficiency of determining the target mini app.

In one embodiment, after the above-mentioned step S140, the mini app switching method further includes the following steps. In step S51, the mini app browsing record in the preset application is updated. In step S52, a mini app satisfying a sorting adjustment condition is determined, according to the updated mini app browsing record. In step S53, the at least one recently browsed mini app is re-determined, based on the mini app satisfying the sorting adjustment condition.

Further, the mini app satisfying the sorting adjustment condition includes: a mini app having not been displayed for a longest time in the preset application in a preset period of time, or a mini app most previously displayed in the preset application.

In one embodiment, a Least Recently Used (LRU) algorithm may be used to obtain a least recently used mini app, i.e., the above-mentioned mini app having not been displayed for the longest time in the preset application in the preset period of time, from the updated mini app browsing record. A First In First Out (FIFO) algorithm may also be used to obtain the mini app most previously displayed in the preset application from the updated mini app browsing record. By means of the LRU algorithm or the FIFO algorithm, a display order of mini apps is changed, and thus it is convenient for the user to quickly select the target mini app.

In this embodiment, after the currently displayed mini app in the application is switched, the mini app browsing record may be updated, and a display order of corresponding mini app display information displayed in the mini app browsing component may be adjusted according to the updated mini app browsing record.

In one embodiment, the above-mentioned step S120 may specifically include the following steps. In step S61, when the mini app browsing record in the preset application is null, at least one mini app is recommended based on pre-collected user browsing behavior information and/or user group characteristic information, in response to the first input. In step S62, mini app display information of the recommended at least one mini app is displayed.

In an example, the user browsing behavior information includes, but is not limited to, mini app identification information, browsing time, browsing number, or browsing duration, etc.

In an example, the user group characteristic information is used to describe attribute characteristics corresponding to a user group. The user group characteristic information is obtained by extracting basic characteristics of users in the user group and users' usage characteristics of an online content service, after the logged-in users of the preset application providing the online content service are grouped. The user group characteristic information includes, but is not limited to, gender, age, height, occupation, consumption level, education level, behavioral characteristics, or psychological characteristics, etc.

In this embodiment, taking into account the service disaster tolerance and new users, when the mini app browsing record cannot be obtained, a collaborative filtering recommendation algorithm may be used to pre-collect the user browsing behavior information and/or the user group characteristic information according to the user's browsing behaviors in the super application, and related mini apps may be recommended to the users and a list of mini app display information may be formed, thereby expanding the ways for users to select mini apps and increasing more opportunities for users to learn about mini apps.

In one embodiment, the step S120 may specifically include the following steps. In step S71, the at least one piece of mini app display information is displayed in an N-square grid, in response to the first input, and N is a positive integer. In step S72, if a number of the at least one piece of mini app display information is less than N, mini app display information of a pre-obtained popular mini app is displayed in the N-square grid simultaneously.

In this embodiment, the commonly used mini app browsing component may be displayed in the N-square grid with N mini app icons and text. When a number of recently browsed mini apps is less than N, the N-square grid may be complemented by the mini app display information of the popular mini app.

In one embodiment, at least two kinds of the following mini app display information may be displayed in the N-square grid simultaneously: the mini app display information of the at least one mini app determined according to the mini app browsing record; the mini app display information of the at least one mini app recommended based on the pre-collected user browsing behavior information and/or user group characteristic information, or the mini app display information of the pre-obtained popular mini app. The mini app display information displayed in the N-square grid may be configured flexibly by the user according to practical requirements.

It should be understood that, in this embodiment, any N-square grid design that can help the user to quickly select the mini app can be used, such as a 16-square grid, a 12-square grid, or an 18-square grid, etc. A number of the squares of the grid may be customized by the user according to practical requirements, which will not be limited by the embodiments of the present disclosure.

In one embodiment, the mini app switching method may further include the following steps. In step S91, the mini app browsing record in the preset application is stored in the terminal provided with the preset application. In step S92, the stored mini app browsing record is uploaded to the designated server through asynchronous reporting.

In this embodiment, the browsing record is localized by storing the mini app browsing record in the terminal provided with the preset application, so that a device on which the preset application is located can quickly respond to user's instructions, and it can prevent the user's opening experience in a non-network or weak-network environment from being damaged. In addition, the asynchronous reporting makes it possible to ensure that the same user has the same experience using different terminals (such as different mobile phones, tablet computers or other hardware products).

According to the embodiments of the present disclosure, further provided is a mini app framework, configured to code-pack a stored computer program and provide a unified Application Program Interface (API) for the code-packed computer program. The program is used to implement any one of the mini app switching methods described in the above-mentioned embodiments.

According to the embodiments provided by the present disclosure, a unified method flow for fast switching can be provided for mini apps based on the mini app framework. In this embodiment, a gesture monitor in the mini app framework can be used to monitor a user's specific gesture input. When the user's specific gesture input is monitored, a mini app browsing component will be called by the framework for the user to click and select a target mini app, and then the selected target mini app is opened through the mini app framework, so as to complete the switching operation. Mini app display information displayed in the mini app browsing component comes from the monitoring and recording of a mini app browsing record by the framework and a server.

Figure 3:
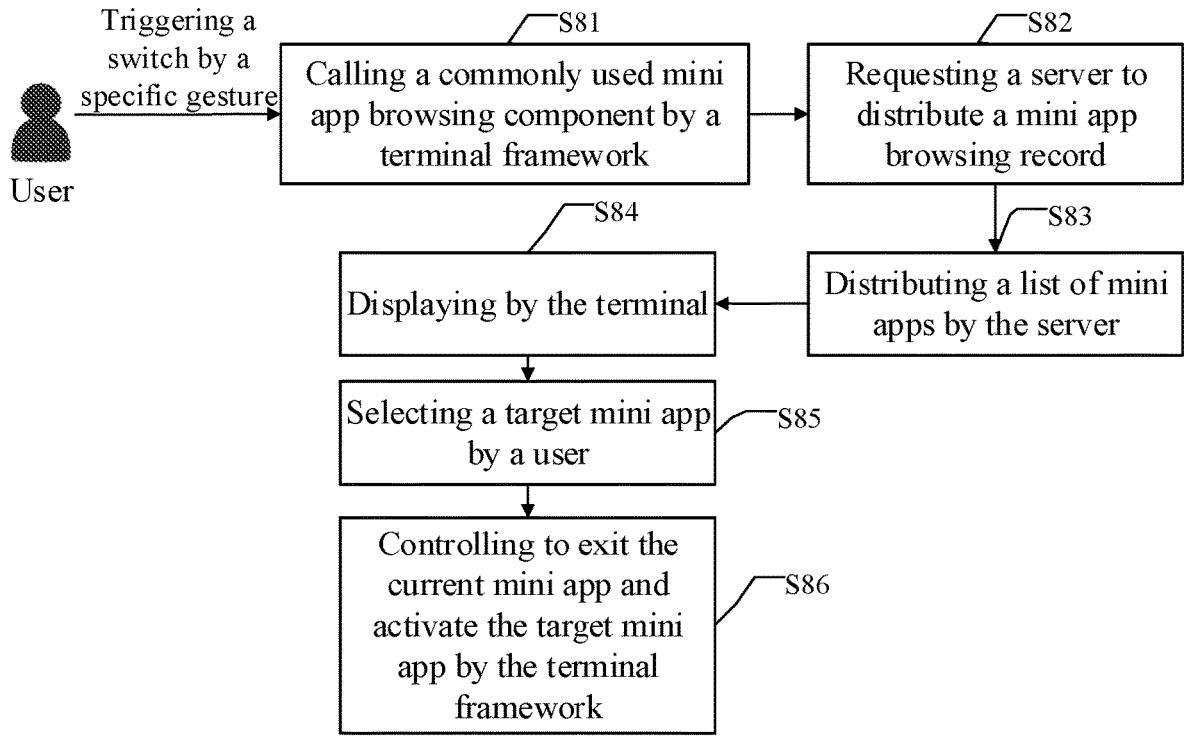
FIG. 3 is another flowchart of a mini app switching method according to an embodiment of the present disclosure.

For the convenience of understanding, the mini app switching process and the reporting of the mini app browsing record according to exemplary embodiments of the present disclosure will be described below in conjunction with FIGS. 3 and 4. FIG. 3 shows another flowchart of a mini app switching method according to an embodiment of the present disclosure. As shown in FIG. 3, the mini app switching method includes the following steps.

In step S81, as shown in "Calling a commonly used mini app browsing component by a terminal framework" in FIG. 3, a terminal calls a mini app browsing component in response to a received specific gesture input for a current mini app, by using a mini app framework in the terminal.

In step S82, as shown in "Requesting a server to distribute a mini app browsing record" in FIG. 3, a designated server is requested to distribute a mini app browsing record of a preset application.

In step S83, as shown in "Distributing a list of mini apps by the server" in FIG. 3, the mini app browsing record distributed by the corresponding server or mini app display information of at least one recently browsed mini app distributed by the corresponding server is received.

In this step, if the mini app browsing record distributed by the corresponding server is received, according to the methods described in the above-mentioned embodiments, at least one recently browsed mini app may be obtained from the mini app browsing record of the preset application according to a sorting of numbers of browsing times, so as to obtain the mini app display information of the at least one recently browsed mini app.

In step S84, as shown in "Displaying by the terminal" in FIG. 3, mini app display information of at least one mini app is displayed in a display interface of a mini app currently displayed in the preset application, by using the commonly used mini app browsing component.

In step S85, as shown in "Selecting a target mini app by a user" in FIG. 3, the user's selection for mini app display information of at least one mini app is received.

In step S86, as shown in "Controlling to exit the current mini app and activate the target mini app by the terminal framework" in FIG. 3, in the preset application, the current mini app is exited and the target mini app is opened, in response to the user's selection for the mini app display information of the at least one mini app.

According to the mini app switching method provided by the embodiments of the present disclosure, a gesture monitor in the mini app framework can be used to monitor a user's operation. When a user's preset gesture operation is monitored, the commonly used mini app browsing component will be called by the mini app framework for the user to click and select a target mini app, and then the selected target mini app is opened through the mini app framework, to complete the switching operation between mini apps, thereby reducing the time cost of switching between mini apps and improving the user experience.

Figure 4:
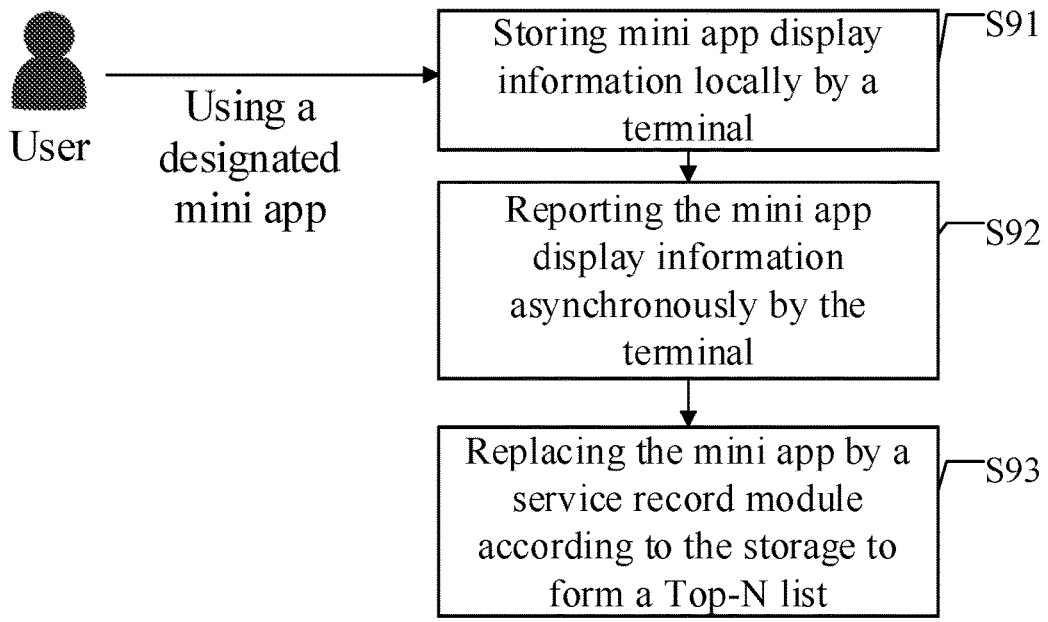
FIG. 4 is a flowchart of reporting a mini app browsing record according to an embodiment of the present disclosure.

FIG. 4 is a flowchart of reporting a mini app browsing record according to an embodiment of the present disclosure. As shown in FIG. 4, reporting the mini app browsing record may include the following steps.

In step S91, as shown in "Storing mini app display information locally by a terminal" in FIG. 4, displayed mini app display information is stored locally in the terminal, according to the mini app display information displayed in a preset application.

In this step, the mini app display information may include a mini app browsing record. A local mini app browsing record of the terminal is updated by storing the mini app display information in the terminal locally.

In step S92, as shown in "Reporting the mini app display information asynchronously by the terminal" in FIG. 4, the stored mini app display information is uploaded to a designated server through asynchronous reporting.

In step S93, as shown in "Replacing the mini app by a service record module according to the storage to form a Top-N list" in FIG. 4, at least one recently browsed mini app is re-determined according to the updated mini app browsing record.

In this embodiment, after the mini app display information such as the mini app browsing record is reported by the terminal, N recently browsed mini apps may be re-determined according to the first N mini apps in the updated mini app browsing record, to form the Top-N list. When there is a least recently used mini app or a mini app displayed in the preset application by the least amount of time, the least recently used mini app or the mini app displayed in the preset application by the least amount of time is placed at a later position in the Top-N list.

Figure 5:
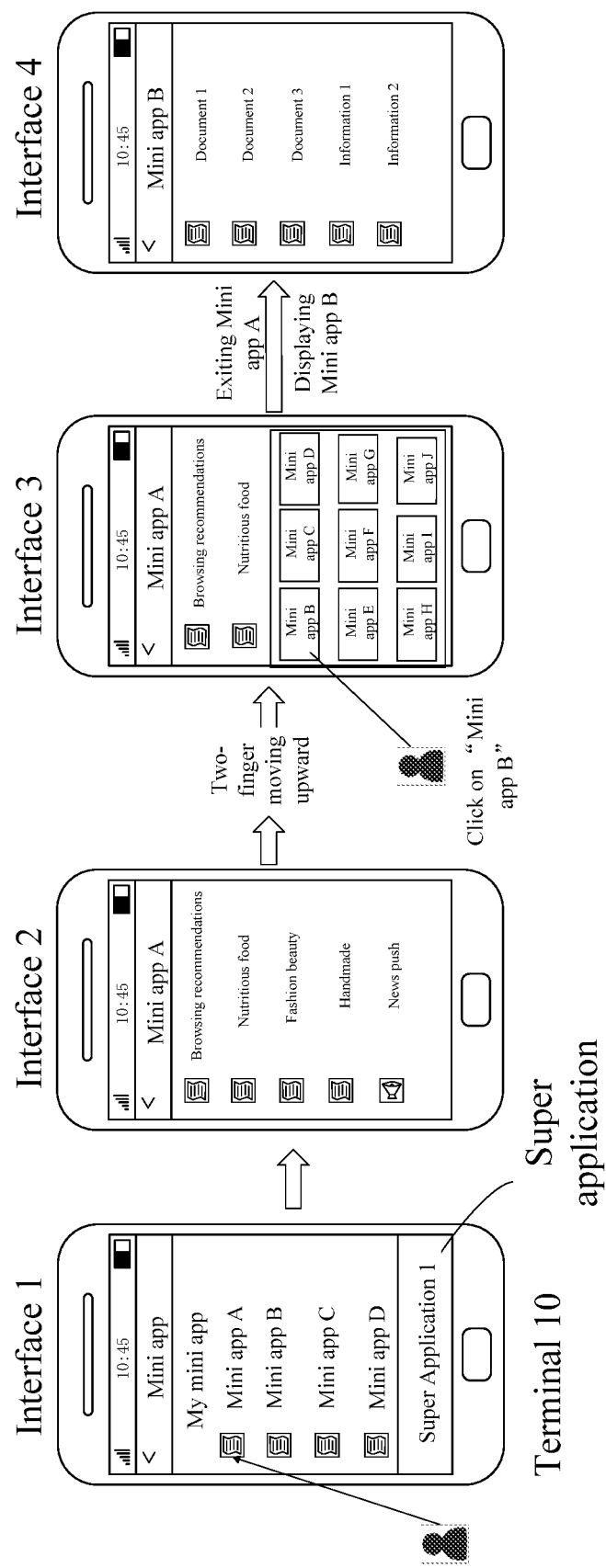
FIG. 5 is a schematic diagram of a scenario in which a commonly used mini app browsing component is called to switch mini apps according to an embodiment of the disclosure.

FIG. 5 is a schematic diagram of a scenario in which a commonly used mini app browsing component is called to switch mini apps according to an embodiment of the disclosure. The same or equivalent structure in FIGS. 5 and 1 uses the same reference numeral.

As shown in an "Interface 1" in FIG. 5, there is a preset application running in a terminal 10, such as a "Super Application 1". In the Super Application 1, a plurality of pieces of mini app display information are displayed through a "My Mini app" browsing component. When a "Mini app A" is selected by a user, the Mini app A will be displayed through an "Interface 2".

As shown in the "Interface 2" in FIG. 5, a current mini app displayed in the Super Application 1 is the Mini app A. In a display interface of the current mini app displayed/run by the preset application, a specific gesture input for the current Mini app A is monitored.

As shown in an "Interface 3" in FIG. 5, in the display interface of the Mini app A, when a two-finger upward sliding input (i.e., two fingers move upward) is monitored, a mini app browsing component is called. In the mini app browsing component, mini app display information of a recently opened mini app is displayed in a 16-square grid, so as to enable the user to select a target mini app according to the displayed mini app display information.

As shown in an "Interface 4" in FIG. 5, when chart and text information of a Mini app B is selected by the user from the mini app browsing component, in the preset application, the currently displayed Mini app A is exited, and the display is switched to the Mini app B.

In one embodiment, when the display is switched from the Mini app A to the Mini app B, a browsing history of the Mini app A may be recorded by the terminal. When the user's specific gesture operation is monitored again, the mini app browsing component is called and a mini app for user selection is displayed, and the mini app for user selection may include the Mini app A, so as to enable the user to select to switch the display from the Mini app B to the Mini app A.

From the mini app switching process described in FIG. 5, it can be seen that when the user is using the Mini app A in the preset application, and needs to switch the current use from the current mini app (e.g., the Mini app A) to another mini app (e.g., the Mini app B), the user only needs to enter a specific gesture operation in the display interface of the Mini app A currently running in the preset application, and the target mini app can be selected on a browsing interface of the mini app display information, thereby quickly switching the current use from the Mini app A to the Mini app B.

Compared with that exiting the Mini app A, returning to the "Interface 1", and selecting another mini app in the "Interface 1", the mini app switching method provided by the embodiments of the present disclosure allows the target mini app to be selected without exiting the current mini app, thereby greatly improving the user's experience of using mini apps. Further, the entire switching process will not distract users from the process, which greatly improves the users' experience.

Figure 6:
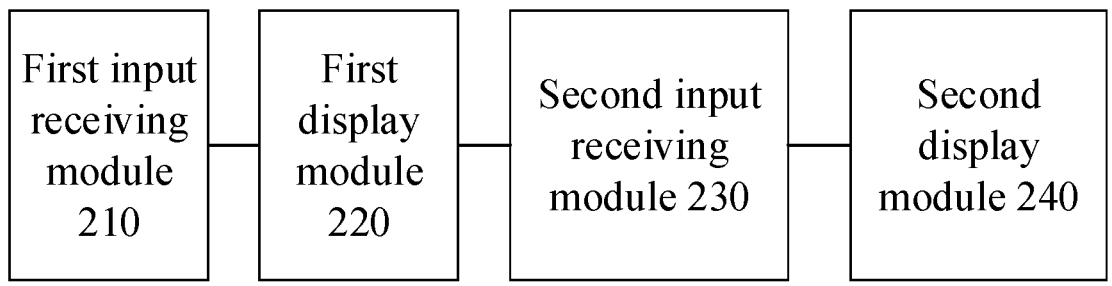
FIG. 6 is a block diagram of a mini app switching device according to an embodiment of the disclosure.

FIG. 6 is a block diagram of a mini app switching device according to an embodiment of the disclosure. As shown in FIG. 6, the mini app switching device includes the following modules.

A first input receiving module 210 is configured to receive a first input for a current mini app. The current mini app is a mini app currently displayed in a preset application.

A first display module 220 is configured to display at least one piece of mini app display information, in response to the first input.

A second input receiving module 230 is configured to receive a second input for target mini app display information among the at least one piece of mini app display information; and A second display module 240 is configured to switch a currently displayed mini app to a target mini app corresponding to the target mini app display information in the preset application, in response to the second input.

In one embodiment, the first input is a specific gesture input, and the specific gesture input is different from another preset gesture input, and the other gesture input is an input for the preset application. The mini app switching device may further include: a gesture monitoring module configured to, before the first input for the current mini app is received, monitor the specific gesture input for the current mini app through a gesture monitor.

In one embodiment, the first display module 220 may specifically include: a component display unit configured to display a mini app browsing component in a preset manner on a display interface of the current mini app, in response to the first input. The first display module 220 may be further specifically configured to display the at least one piece of mini app display information through the mini app browsing component.

In one embodiment, the first display module 220 may specifically include: a record obtaining unit configured to obtain a mini app browsing record of the preset application, in response to the first input, the mini app browsing record being from a terminal provided with the preset application or a designated server; and a recently-browsed-mini app obtaining unit configured to obtain at least one recently browsed mini app from the mini app browsing record of the preset application, according to a sorting of the number of browsing. The first display module 220 may be further specifically configured to display mini app display information of the at least one recently browsed mini app.

In one embodiment, the mini app switching device may further include: a record updating unit configured to update the mini app browsing record in the preset application; a mini app-to-be-adjusted obtaining unit configured to determine a mini app satisfying a sorting adjustment condition, according to the updated mini app browsing record; and a recently-browsed-mini app updating unit configured to re-determine the at least one recently browsed mini app, based on the mini app satisfying the sorting adjustment condition.

In one embodiment, the mini app satisfying the sorting adjustment condition includes: a mini app having not been displayed for a longest time in the preset application in a preset period of time, or a mini app most previously displayed in the preset application.

In one embodiment, the mini app switching device may further include: a mini app recommendation module configured to, when the mini app browsing record in the preset application is null, recommend at least one mini app based on pre-collected user browsing behavior information and/or user group characteristic information, in response to the first input. The first display module 220 may be further specifically configured to display mini app display information of the recommended at least one mini app.

In one embodiment, the first display module 220 is further specifically configured to: display the at least one piece of mini app display information in an N-square grid, in response to the first input, N being a positive integer; and display mini app display information of a pre-obtained popular mini app in the N-square grid simultaneously, if a number of the at least one piece of mini app display information is less than N.

In one embodiment, the mini app switching device may further include: a record storage module configured to store the mini app browsing record in the preset application in the terminal provided with the preset application; and a record reporting module configured to upload the stored mini app browsing record to the designated server through asynchronous reporting.

According to the mini app switching device provided by the embodiments of the present disclosure, the problems of the user's inconvenience in an operation of switching mini apps, the single switching method and the long process can be solved. Without exiting a current mini app, it can be chosen by a user to switch the display to a recently opened mini app, which greatly improves the user's experience of using mini apps.

Figure 7:
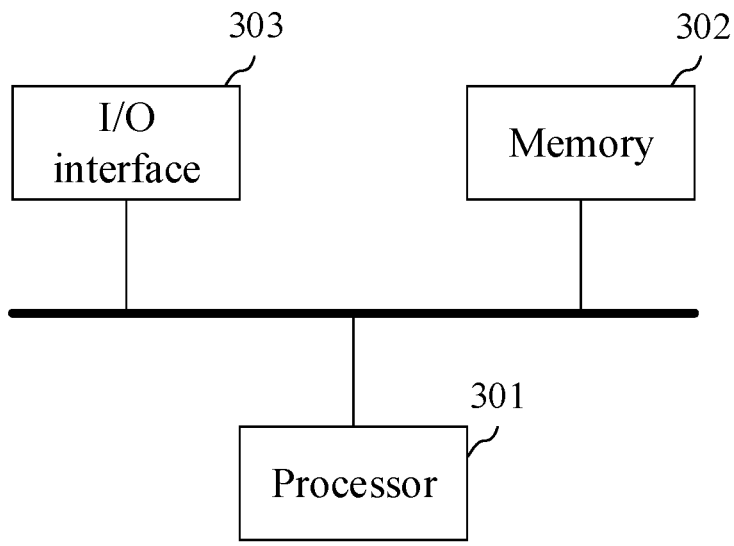
FIG. 7 is a block diagram of an electronic apparatus according to an embodiment of the present disclosure.

FIG. 7 is a block diagram of an electronic apparatus according to an embodiment of the present disclosure. As shown in FIG. 7, according to the embodiments of the present disclosure, provided is an electronic apparatus including: at least one processor 301; a memory 302 storing at least one program thereon, where when the at least one program is executed by the at least one processor, the at least one processor implements any one of the above-mentioned mini app switching methods; and at least one I/O interface 303 connected between the at least one processor and the memory, and configured to implement information interaction between the processor and the memory.

The processor 301 is a device having a data processing capability, and includes, but is not limited to, a central processing unit (CPU) and the like. The memory 302 is a device having a data storage capability, and includes, but is not limited to, a random access memory (RAM, more specifically, such as a synchronous dynamic RAM (SDRAM), a double data rate SDRAM (DDR SDRAM), etc.), a read only memory (ROM), an electrically erasable programmable read only memory (EEPROM), and a flash memory (FLASH). The I/O interface (read/write interface) 303 is connected between the processor 301 and the memory 302, enables the information interaction between the processor 301 and the memory 302, and includes, but is not limited to, a data bus etc.

In some embodiments, the processor 301, the memory 302, and the I/O interface 303 are connected to each other through a bus, so as to be further connected to other components of the electronic apparatus.

Figure 8:
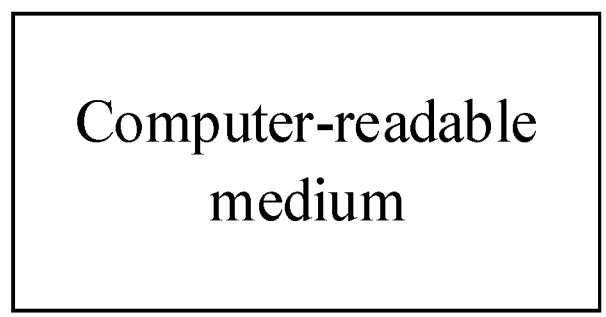
FIG. 8 is a block diagram of a computer-readable medium according to an embodiment of the present disclosure.

FIG. 8 is a block diagram of a computer-readable medium according to an embodiment of the present disclosure. As shown in FIG. 8, according to the embodiments of the present disclosure, provided is a computer-readable medium storing a computer program thereon. When the computer program is executed by a processor, any one of the above-mentioned mini app switching methods is implemented.

It should be understood by those having ordinary skill in the art that the functional modules/units in all or some of the steps, systems, and devices in the method disclosed above may be implemented as software, firmware, hardware, or suitable combinations thereof. If implemented as hardware, the division between the functional modules/units stated above does not necessarily correspond to the division of physical components; for example, one physical component may have a plurality of functions, or one function or step may be performed through cooperation of several physical components. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). As well known by those having ordinary skill in the art, the term "computer storage media" includes volatile/nonvolatile and removable/non-removable media used in any method or technology for storing information (such as computer-readable instructions, data structures, program modules and other data). The computer storage media include, but are not limited to, RAM, ROM, EEPROM, flash memory or other memory techniques, CD-ROM, digital versatile disk (DVD) or other optical discs, magnetic cassette, magnetic tape, magnetic disk or other magnetic storage devices, or any other media which can be used to store the desired information and can be accessed by a computer. In addition, it is well known by those having ordinary skill in the art that the communication media generally include computer-readable instructions, data structures, program modules or other data in a modulated data signal, such as a carrier wave or other transmission mechanism, and may include any information delivery media.

It should be understood that both the exemplary embodiments and the specific terms disclosed in the present disclosure are for the purpose of illustration, rather than for limiting the present disclosure. It is obvious to those having ordinary skill in the art that the features, characteristics and/or elements described in connection with a particular embodiment may be used alone or in combination with the features, characteristics and/or elements described in connection with other embodiments, unless expressly indicated otherwise. Therefore, it should be understood by those having ordinary skill in the art that various changes in form and detail may be made without departing from the scope of the present disclosure as set forth in the appended claims.

The invention claimed is:

1. A mini application (app) switching method, comprising:
    receiving a first input for a current mini app, wherein the current mini app is a mini app currently displayed and run in a preset application;
    displaying mini app display information of a plurality of other mini apps which are capable of being run in the present application, in response to the first input;
    receiving a second input for target mini app display information among the mini app display information of the plurality of other mini apps; and
    switching the current mini app to a target mini app corresponding to the target mini app display information in the preset application, in response to the second input,
    wherein displaying the mini app display information of the plurality of other mini apps, in response to the first input, comprises:
    displaying the mini app display information of the plurality of other mini apps one-to-one in a plurality of grids arranged in M rows and N columns, in response to the first input, wherein each of M and N is a positive integer greater than 1; and
    complementing the grid including N squares by using mini app display information of at least one pre-obtained mini app in response to a number of the plurality of other mini apps being less than a number of the plurality of grids.

2. The method according to claim 1, wherein
    the first input is a specific gesture input, the specific gesture input is different from an other preset gesture input, and the other gesture input is an input for the preset application; and
    before receiving the first input for the current mini app, the method further comprises:
    monitoring the specific gesture input for the current mini app through a gesture monitor.

3. The method according to claim 1, wherein displaying the mini app display information of the plurality of other mini apps, in response to the first input, comprises:
    displaying a mini app browsing component in a preset manner on a display interface of the current mini app, in response to the first input; and
    displaying the mini app display information of the plurality of other mini apps through the mini app browsing component.

4. The method according to claim 1, wherein displaying the mini app display information of the plurality of other mini apps, in response to the first input, comprises:
    obtaining a mini app browsing record of the preset application, in response to the first input, wherein the mini app browsing record is from a terminal provided with the preset application or a designated server;
    obtaining at least one recently browsed mini app from the mini app browsing record of the preset application, according to a sorting of a number of browsing; and displaying mini app display information of the at least one recently browsed mini app.

5. The method according to claim 4, after switching the currently displayed mini app to the target mini app corresponding to the target mini app display information, further comprising:
updating the mini app browsing record in the preset application;
determining a mini app satisfying a sorting adjustment condition, according to the updated mini app browsing record; and
re-determining the at least one recently browsed mini app, based on the mini app satisfying the sorting adjustment condition.

6. The method according to claim 5, wherein
the mini app satisfying the sorting adjustment condition comprises: a mini app having not been displayed for a longest time in the preset application in a preset period of time, or a mini app most previously displayed in the preset application.

7. The method according to claim 1, wherein displaying the mini app display information of the plurality of other mini apps, in response to the first input, comprises:
recommending at least one mini app based on pre-collected user browsing behavior information and/or user group characteristic information, in response to the first input, when a mini app browsing record in the preset application is null; and
displaying mini app display information of the recommended at least one mini app.

8. The method according to claim 1, further comprising:
storing a mini app browsing record in the preset application in a terminal provided with the preset application; and
uploading the stored mini app browsing record to a designated server through asynchronous reporting.

9. A mini app framework, configured to code-pack a stored computer program and provide a unified Application Program Interface for the code-packed computer program, wherein the computer program is used to implement the mini app switching method according to claim 1.

10. An electronic apparatus, comprising:
at least one processor;
a memory storing at least one program thereon; and
at least one I/O interface connected between the at least one processor and the memory, and configured to implement information interaction between the at least one processor and the memory; wherein
when the at least one program is executed by the at least one processor, the at least one processor implements:
receiving a first input for a current mini application (app), wherein the current mini app is a mini app currently displayed and run in a preset application;
displaying mini app display information of a plurality of other mini apps which are capable of being run in the present application, in response to the first input;
receiving a second input for target mini app display information among the mini app display information of the plurality of other mini apps; and
switching a currently displayed mini app to a target mini app corresponding to the target mini app display information in the preset application, in response to the second input,
wherein when the at least one program is executed by the at least one processor, the at least one processor further implements:

displaying the mini app display information of the plurality of other mini apps one-to-one in a plurality of grids arranged in M rows and N columns, in response to the first input, wherein each of M and N is a positive integer greater than 1; and
complementing the grid including N squares by using mini app display information of at least one pre-obtained mini app in response to a number of the plurality of other mini apps being less than a number of the plurality of grids.

11. A non-transitory computer-readable storage medium storing a computer program thereon, wherein the computer program is executed by a processor to implement the mini app switching method according to claim 1.

12. The apparatus according to claim 10, wherein
the first input is a specific gesture input, the specific gesture input is different from an other preset gesture input, and the other gesture input is an input for the preset application; and
before receiving the first input for the current mini app, the at least one processor is further configured to:
monitor the specific gesture input for the current mini app through a gesture monitor.

13. The apparatus according to claim 10, wherein the at least one processor is further configured to:
display a mini app browsing component in a preset manner on a display interface of the current mini app, in response to the first input; and
display the mini app display information of the plurality of other mini apps through the mini app browsing component.

14. The apparatus according to claim 10, wherein the at least one processor is further configured to:
obtain a mini app browsing record of the preset application, in response to the first input, wherein the mini app browsing record is from a terminal provided with the preset application or a designated server;
obtain at least one recently browsed mini app from the mini app browsing record of the preset application, according to a sorting of a number of browsing; and
display mini app display information of the at least one recently browsed mini app.

15. The apparatus according to claim 14, wherein after switching the currently displayed mini app to the target mini app corresponding to the target mini app display information, the at least one processor is further configured to:
update the mini app browsing record in the preset application;
determine a mini app satisfying a sorting adjustment condition, according to the updated mini app browsing record; and
re-determine the at least one recently browsed mini app, based on the mini app satisfying the sorting adjustment condition.

16. The apparatus according to claim 15, wherein
the mini app satisfying the sorting adjustment condition comprises: a mini app having not been displayed for a longest time in the preset application in a preset period of time, or a mini app most previously displayed in the preset application.

17. The apparatus according to claim 10, wherein the at least one processor is further configured to:
recommend at least one mini app based on pre-collected user browsing behavior information and/or user group characteristic information, in response to the first input, when a mini app browsing record in the preset application is null; and display mini app display information of the recommended at least one mini app.

18. The apparatus according to claim 10, wherein the at least one processor is further configured to:
store a mini app browsing record in the preset application in a terminal provided with the preset application; and
upload the stored mini app browsing record to a designated server through asynchronous reporting.

\* \* \* \* \*